United States Patent
Watanabe et al.

(10) Patent No.: US 8,236,868 B2
(45) Date of Patent: Aug. 7, 2012

(54) PROCESS FOR PRODUCING POLYURETHANE ELASTOMER FOAMS

(75) Inventors: Tetsuya Watanabe, Ibaraki (JP); Takashi Chiba, Ibaraki (JP); Hiroyuki Otani, Ibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 568 days.

(21) Appl. No.: 12/310,638

(22) PCT Filed: Jun. 25, 2007

(86) PCT No.: PCT/JP2007/062704
§ 371 (c)(1),
(2), (4) Date: Mar. 2, 2009

(87) PCT Pub. No.: WO2008/026367
PCT Pub. Date: Mar. 6, 2008

(65) Prior Publication Data
US 2010/0230879 A1   Sep. 16, 2010

(30) Foreign Application Priority Data
Aug. 29, 2006   (JP) ................... 2006-231973

(51) Int. Cl.
*C08G 18/10*   (2006.01)

(52) U.S. Cl. ......... 521/159; 521/130; 521/170; 521/174

(58) Field of Classification Search .......... 521/130, 521/159, 170, 174
See application file for complete search history.

(56) References Cited

U.S. PATENT DOCUMENTS

| | | | | |
|---|---|---|---|---|
| 3,631,146 A | * | 12/1971 | Briggs et al. | 524/137 |
| 6,037,383 A | * | 3/2000 | Krech et al. | 521/155 |
| 6,063,824 A | * | 5/2000 | Krech et al. | 521/121 |
| 6,197,839 B1 | * | 3/2001 | Genz et al. | 521/130 |
| 6,310,114 B1 | * | 10/2001 | Genz et al. | 521/159 |
| 6,444,777 B1 | | 9/2002 | Genz et al. | |
| 2001/0031797 A1 | | 10/2001 | Kuwamura et al. | |
| 2005/0038131 A1 | | 2/2005 | Narishima et al. | |

* cited by examiner

*Primary Examiner* — John Cooney
(74) *Attorney, Agent, or Firm* — Brinks Hofer Gilson & Lione

(57) ABSTRACT

Polyurethane elastomer foams can be prepared by mixing an isocyanate-terminated prepolymer obtained by reaction of a polyol with 3,3'-dimethylbiphenyl-4,4'-diisocyanate, with a foaming agent comprising a mixture of water, a low-molecular weight glycol having a molecular weight of 48-200, and a high-molecular weight glycol having a number average molecular weight Mn of 1000-3000 under stirring to conduct foaming reaction. The polyurethane elastomer foams so produced can have a high durability, particularly under a high load, even though a low-cost, easy-to-handle diisocyanate compound is used.

9 Claims, No Drawings

PROCESS FOR PRODUCING POLYURETHANE ELASTOMER FOAMS

RELATED APPLICATION

This application is a 35 U.S.C. §371 national stage filing of International Patent Application No. PCT/JP2007/062704, filed Jun. 26, 2007, to which priority is claimed under 35 U.S.C. §120 and through which and to which priority is claimed to Japanese Priority Patent Application No. 2006-231973, filed Aug. 29, 2006.

TECHNICAL FIELD

The present invention relates to a process for producing polyurethane elastomer foams, and more particularly to a process for producing polyurethane elastomer foams for effective use as automobile elastomer parts such as auxiliary springs, etc. in the automobile suspension section.

BACKGROUND ART

Polyurethane elastomer foams in a fine cellular structure have distinguished vibration damping property and shock absorbability, and are largely used as auxiliary springs, etc. in the automobile suspension section from the viewpoints of dynamic characteristics under a high load, durability and permanent set resistance. Particularly, polyurethane elastomer foams based on 1,5-naphthalene diisocyanate (NDI) have distinguished flex fatigue resistance characteristics, and thus are largely used in auxiliary spring positions, requiring high durability, However, NDI is higher in material cost than other diisocyanate compounds, and also is higher in the reactivity, that is, it has a hard-to-handle problem.

Breaking mechanism of automobile auxiliary springs seems to be due to heat generation of materials themselves caused by repeated flex transformations, resulting in a decrease in physical characteristics of materials exposed to the elevated temperature, and in ultimate generation of local cracking. Thus, it is indispensable that the auxiliary spring materials having a distinguished durability must undergo no more reduction in physical properties even in high-temperature circumstances, the polyurethane molecular chains having a strong cross-linking structure must furthermore have a higher level dimensional structure. However, the conventional processes such as butch mixing (one-shot method) of a diisocyanate with a high-molecular weight diol, and a chain extender (low-molecular weight diol), or preparation of prepolymer by reaction of a high-molecular weight diol with a diisocyanate in advance, followed by chain elongation by a low-molecular weight diol (prepolymer method) have been so far not successful in obtaining a higher level dimensional structure of polyurethane molecule chain having such a strong cross-linking structure from other aromatic diisocyanates than NDI.

Non-Patent Literature 1 Dictionary of Plastic Functional Polymeric Materials (2004), page 426, published by Dictionary Publishing Center of Sangyo-chosakai

DISCLOSURE OF THE INVENTION

Problem to be Solved by the Invention

The object of the present invention is to provide a process for producing polyurethane elastomer foams having a high durability, particularly under a high load, even with a low-cost, easy-to-handle diisocyanate compound.

Means for Solving the Problem

The object of the present invention can be attained by a process for producing polyurethane elastomer foams, which comprises mixing an isocyanate-terminated prepolymer prepared by reaction of polyol with 3,3'-dimethylbiphenyl-4,4'-diisocyanate, with a foaming agent comprising a mixture of water, a low-molecular weight glycol having a molecular weight of 48-200, and a high-molecular weight glycol having a number average molecular weight Mn of 1000-3000, from stirring, thereby conducting foaming reaction.

Effect of the Invention

Polyurethane elastomer foams produced by the present process can have physical characteristics even by using low-cost, easy-to-handle 3,3'-dimethylbiphenyl-4,4'-diisocyanate (tolydine diisocyanate: TODI) as a diisocyanate compound, equivalent to those of urethane elastomer foams produced by a high-cost NDI. This is a distinguished effect of the present invention.

Specifically, the elongation at break determined by holding a test piece at 100° C. for one hour and conducting a test of elongation at break at the same temperature, according to the ordinary rubber material elongation test procedure has been found to be 75% or more, equivalent to the elongation at break at the ordinary temperature. That is, the present polyurethane elastomer foams have such characteristics as small reduction in physical characteristics at elevated temperatures.

In the foaming curing reaction in the present process for producing polyurethane elastomer foams, it seems that hard segments initially grow by reaction of highly reactive water and a low-molecular weight glycol with an excessive amount of diisocyanate present in the urethane prepolymer, and then soft segment grow by reaction of a high-molecular weight glycol of low reactivity with the remaining isocyanate groups, resulting in chain elongation of hard segments and soft segments and progress of micro-phase separation, whereby physical cross-linkability can be enhanced.

Thus, even polyurethane elastomer foams produced by reaction of low-cost diisocyanate compounds other than NDI with polyol can be effectively used as automobile elastomer parts, such as automobile springs, requiring high durability, etc., which have been so far regarded as unsuitable for such application.

BEST MODES FOR CARRYING OUT THE INVENTION

So long as the polyol is a long-chain, active hydrogen-terminated glycol having a number average molecular weight Mn of 500-4000, preferably 1000-3000, and a hydroxyl value of 30-150, preferably 40-100, any one of various polyester-based, polyether-based, polycarbonate-based, silicone-based, 1,4-polybutadiene-based, 1,2-polybutadiene-based, and castor oil-based polyols, or other polyols, or their mixtures can be used without any particular restriction. Reason why Mn of the polyol is limited to 500-4000 is that, when Mn is less than 500, the flexibility of polyurethane elastomer foams will be deteriorated, so the foams will become brittle, whereas, when Mn is more than 4000, the hardness of polyurethane elastomer foams will be lowered, so the foams cannot have a sufficient material strength.

Diisocyanate to react with the polyol is 3,3'-dimethylbiphenyl-4,4'-diisocyanate (TODI), which can be used in such a proportion that the isocyanate group is more than 1 to less than 5 equivalent, preferably less than 4 equivalent, on the basis of one equivalent weight of the OH group of the polyol. When the diisocyanate component is used in such a proportion that the isocyanate group is one or less equivalent, no isocyanate-terminated prepolymer will be formed, whereas in a proportion of more than 5 equivalent, the hardness of polyurethane elastomer foams will be increased, so the foams will not be suitable for use as buffering parts.

Reaction of a polyol with a diisocyanate can be carried out at about 90° to about 130° C. for about 15 minutes to about one hour to form a prepolymer.

0.1-5.0 parts by weight, preferably 0.2-3.0 parts by weight, of water, 0.1-5.0 parts by weight, preferably 0.2-3.0 parts by weight, of a low-molecular weight glycol having a molecular weight of 48-200, preferably 62-160, and 0.5-70 parts by weight, preferably 1-50 parts by weight, of a high-molecular weight glycol having a number average molecular weight Mn of 1,000-3,000, preferably 1,000-2,000, can be used as a foaming agent on the basis of 100 parts by weight of isocyanate-terminated prepolymer. Without the low-molecular weight glycol hard segments fail to grow, whereas without the high-molecular weight glycol soft segments fail to grow, so neither hard segments nor soft segments can attain chain elongation in any way, resulting in a failure in enhancement of physical cross-linkability.

The low-molecular weight glycol for use herein includes, for example, ethylene glycol, propylene glycol, 1,4-butanediol, 1,6-hexanediol, 1,4-bis(2-hydroxyethoxy)benzene, etc. and the high-molecular weight glycol for use herein includes, for example, preferably those belonging to the same category as used in the prepolymer formation, more preferably the same kinds of polyols, specifically ethylene adipate polyesterpolyol, ethylene butylene adipate polyesterpolyol, polytetramethylene glycol, polypropylene glycol, etc. Reason why Mn of the high-molecular weight glycol is limited to 1,000-3,000 is that, when Mn is less than 1,000, the flexibility-requiring soft segments fail to form, whereas, when Mn is more than 3,000, the foaming agent will be highly viscous, so their handling will be unpreferably hard to conduct.

A foam-regulating agent as a component for determining a cellular structure such as a silicone foam-regulating agent can be preferably used together with the foaming agent in a proportion of usually 0.1-3.0 parts by weight, preferably 0.2-2.0 parts by weight, on the basis of 100 parts by weight of prepolymer. In the polyurethanization reaction, an amine compound, etc. can be allowed to take part in the reaction as a catalyst. Besides the afore-mentioned components, a filler, an oxide or hydroxide of divalent metal, a lubricant, etc. can be used, if required, upon proper combination.

Polyurethanization reaction can be carried out by mixing the prepolymer with these foaming agent, foam-regulating agent, and catalyst, followed by cast molding in a mold of desired capacity. After mold release, secondary cross-linking (annealing) is carried out preferably at about 80° to about 150° C. for about 5 to about 24 hours to obtain polyurethane elastomer foams.

EXAMPLES

The present invention will be described in detail below, referring to Examples. In each of Examples, Comparative Examples, and Reference Example, which follow, polyurethane elastomer foams were used and molded in the following conditions:

Prepolymer temperature used in foaming urethanization reaction: about 70° to about 80° C.
Foaming agent temperature used in foaming polyurethanization reaction: about 50° to about 60° C.
Mold temperature: about 50° to about 60° C.
Mold release time: about 15 to about 20 minutes
Secondary cross-linking 120° C. for 24 hours
Sheet-shaped test samples and automobile suspension auxiliary spring-shaped test samples were molded at a molding density of 0.5 g/cm$^3$, where the sheet-shaped samples were made by slicing a molded block in a size of 30 mm×60 mm×150 mm into pieces in a size of 30 mm×60 mm×2 mm after the secondary vulcanization.

Example 1

100 parts by weight of ethylene adipate-based polyester polyol having a number average molecular weight Mn of 2,000, and a hydroxyl value of 56 was melted at 120° C., and charged into a reactor preheated to 120° C., and 40 parts by weight of TODI (ratio of NCO/OH by equivalent: 3.0) was added thereto under stirring to conduct reaction for 30 minutes, thereby obtaining an urethane prepolymer. Independently, 150 parts by weight of water, 150 parts by weight of 1,4-butanediol, 100 parts by weight of a foam-regulating agent, and 10 parts by weight of an amine-based catalyst were added to 3937 parts by weight of ethylene adipate-based polyester polyol having an average number molecular weight Mn of 2,000 and a hydroxyl value of 56, as melted at 60° C., followed by mixing under stirring for 2 hours to obtain a foaming agent.

The urethane prepolymer and the foaming agent were mixed together under stirring in a proportion of the former to the latter of 100:26.3 by weight under the afore-mentioned temperature conditions to conduct foaming reaction, and the molded product was subjected to secondary cross-linking to obtain test samples.

Example 2

In Example 1, 149 parts by weight of trimethylolpropane was used in place of 1,4-butanediol as a foaming agent component.

Example 3

100 parts by weight of ethylene adipate-based polyester polyol having a number average molecular weight Mn of 2,000 and a hydroxyl value of 67 was melted at 120° C. and charged into a reactor preheated at 120° C., and then 40 parts by weight of TODI (NCO/OH equivalent ratio 2.5) was added thereto under stirring to conduct reaction for 30 minutes, thereby obtaining an urethane prepolymer. Independently, 150 parts by weight of water, 150 parts by weight of 1,4-butanediol, 100 parts by weight of a foam-regulating agent, and 10 parts by weight of an amine-based catalyst were added to 4436 parts by weight of ethylene adipate-based polyester polyol having a number average molecular weight Mn of 2,000 and a hydroxyl value of 56, melted at 60° C., followed by mixing for 2 hours under stirring to obtain a foaming agent.

The urethane prepolymer and the foaming agent were mixed together in a weight ratio of the former to the latter of 100:26.0 to conduct foaming reaction, followed by vulcanization to obtain test samples.

Comparative Example 1

In Example 1, the amount of TODI was changed to 30 parts by weight (NCO/OH equivalent ratio: 2.3), and while no ethylene adipate-based polyester polyol was used, the other components were used in the same amounts to prepare a foaming agent.

The urethane prepolymer and the foaming agent were mixed together in a weight ratio of the former to the latter of 100:2.0 to conduct foaming reaction, followed by vulcanization to obtain test samples.

Comparative Example 2

In Comparative Example 1, 149 parts by weight of trimethylolpropane was used in place of 1,4-butanediol in the foaming agent components.

Comparative Example 3

In Example 1, 45 parts by weight of MDI (NCO/OH equivalent ratio: 3.6) was used in place with TODI to prepare a urethane prepolymer, whereas the amount of ethylene adipate-based polyester polyol was changed to 2480 parts by weight, and the amount of amine-based catalyst to 8 parts by weight in the foaming agent components to prepare a foaming agent.

The urethane prepolymer and the foaming agent were mixed together in a weight ratio of 100:23.0 to conduct foaming reaction, followed by vulcanization to obtain test samples.

Reference Example 100 parts by weight of ethylene adipate-based polyester polyol having a number average molecular weight Mn of 2,000, and a hydroxyl value of 56 was melted at 120° C., and charged into a reactor preheated to 120° C., and 20 parts by weight of NDI (NCO/OH equivalent ratio: 1.9) was added thereto under stirring to conduct reaction for 30 minutes, thereby obtaining a urethane prepolymer. Independently, 150 parts by weight of water, 150 parts by weight of 1,4-butanediol, 100 parts by weight of a foam-regulating agent, and 2 parts by weight of an amine-based catalyst were mixed together for 2 hours under stirring to obtain a foaming agent.

The urethane prepolymer and the foaming agent were mixed together in a weight ratio of the former to the latter of 100:1.5 to conduct foaming reaction, followed by vulcanization, thereby obtaining a test sample.

Sheet-shaped test samples obtained in the foregoing Examples, Comparative Examples, and Reference Example were subjected to determination of glass transition point, hardness, tensile strength, elongation at break, and compression set, and auxiliary spring-shaped samples for the automobile suspension were subjected to determination of auxiliary spring durability.

- Hardness Spring-type Asker C model
- Tensile strength and elongation at break according to JIS K6261 corresponding to ASTM D412 (sample shape: dumbell-shaped No. 3)
- Compression set according to JIS K6262 corresponding to ASTM D395 (three-laminated sheets, 13 mm in diameter and 2 mm in thickness sheet, 25% compression at 80° C. for 70 hours)
- Auxiliary spring durability evaluated by the presence of cracks after 100,000 runs of compression at 10 kN and 1 Hz, where the absence of cracks is marked as "○", whereas the presence of cracks are marked as number of runs of compression up to the generation of cracks The results are shown in the following Table together with mixing proportions.

TABLE

|  | Ex. No. | | | Comp. Ex. No. | | | Ref. Ex. |
| --- | --- | --- | --- | --- | --- | --- | --- |
|  | 1 | 2 | 3 | 1 | 2 | 3 |  |
| [Composition] | | | | | | | |
| Urethane polymer | | | | | | | |
| Polyesterpolyol (OH value: 56) | 100 | 100 |  | 100 | 100 | 100 | 100 |
| Polyesterpolyol (OH value: 67) |  |  | 100 |  |  |  |  |
| TODI | 40 | 40 | 40 | 30 | 30 |  |  |
| MDI |  |  |  |  |  | 45 |  |
| NDI |  |  |  |  |  |  | 20 |
| Foaming agent | | | | | | | |
| Polyesterpolyol (OH value: 56) | 33.39 | 33.39 | 33.34 |  |  | 28.68 |  |
| H$_2$O | 1.27 | 1.27 | 1.13 | 0.95 | 0.95 | 1.73 | 0.68 |
| 1,4-butanediol | 1.27 |  | 1.13 | 0.95 |  | 1.73 | 0.68 |
| Trimethylolpropane |  | 1.26 |  |  | 0.95 |  |  |
| Silicone-based foam-regulating agent (SH193 OIL, a product of Toray-Dow Corning silicone) | 0.85 | 0.85 | 0.75 | 0.64 | 0.64 | 1.16 | 0.45 |
| Amine-based catalyst (DABCO, a product of Air Products Japan) | 0.08 | 0.08 | 0.08 | 0.06 | 0.06 | 0.09 | 0.01 |
| [Determination items] | | | | | | | |
| Glass transition point (° C.) | −38 | −39 | −39 | −36 | −39 | −35 | −34 |
| Hardness | 75 | 74 | 74 | 75 | 74 | 76 | 73 |
| Tensile strength | | | | | | | |
| Normal temp. (MPa) [A] | 5.5 | 5.7 | 5.7 | 5.4 | 5.7 | 5.8 | 6.2 |
| 100° C. (MPa) [B] | 1.5 | 1.5 | 1.5 | 1.2 | 1.2 | 1.3 | 1.7 |
| Persistency ([B]/[A]; %) | 27 | 26 | 26 | 22 | 21 | 22 | 27 |
| Elongation at break | | | | | | | |
| Normal temp. (%) [C] | 490 | 500 | 490 | 480 | 480 | 440 | 420 |
| 100° C. (%) [D] | 400 | 380 | 400 | 270 | 300 | 350 | 350 |
| Persistency ([D]/[C]; %) | 82 | 76 | 82 | 56 | 63 | 80 | 83 |
| Compression set (%) | 24 | 21 | 21 | 28 | 21 | 29 | 22 |
| Auxiliary spring durability (100,000 runs of compression) | ○ | ○ | ○ | 7000 | ○ | ○ | ○ |

Industrial Utility

Molded polyurethane elastomer foams produced by the present process have a higher level dimensional structure endowed with a high physical cross-linkability, and thus can maintain a strong rubbery elasticity even if exposed to surroundings where the material undergoes heat generation due to repeated compressions. That is, they can be effectively used as automobile elastomer parts such as auxiliary spring materials in the automobile suspension section, requiring highly durable functions.

Besides the afore-mentioned uses, they can be also used as parts of machines, automobiles, and precision units such as castors, rolls, packings, seal materials, vibration-damping parts, ball joints, etc.; as sport or leisure articles such as shoe soles, ski boots, snow chains, etc. or conveyor belt, keyboard sheets and gaskets; and electric wiring such as automobile wiring, etc.; and rope coating, etc.

The invention claimed is:

1. A process for producing polyurethane elastomer foams, which comprises mixing an isocyanate-terminated prepolymer consisting of an isocyanate-terminated prepolymer obtained by reaction of polyol with 3,3'-dimethylbiphenyl-4,4'-diisocyanate, which is used in a proportion so that the isocyanate group of the 3,3'-dimethylbiphenyl-4,4'-diisocyanate is more than 1 less than 5 equivalents on the basis of one equivalent weight of the OH group of the polyol, with a foaming agent comprising a mixture of water, a low-molecular weight glycol having a molecular weight of 48-200, and a high-molecular weight glycol having a number average molecular weight Mn of 1000-3000 under stirring, thereby conducting foaming reaction.

2. A process for producing polyurethane elastomer foams according to claim 1, wherein the polyol is a polyol having a number average molecular weight Mn of 500-4000.

3. A process for producing polyurethane elastomer foams according to claim 2, wherein the high-molecular weight glycol is the same polyol as used in the synthesis of the isocyanate-terminated prepolymer.

4. A process for producing polyurethane elastomer foams according to claim 1, wherein on the basis of 100 parts by weight of the isocyanate-terminated prepolymer, the water is used in a proportion of 0.1-5.0 parts by weight, the low-molecular weight glycol in a proportion of 0.1-5.0 parts by weight, and the high-molecular glycol in a proportion of 0.5-7.0 parts by weight.

5. Polyurethane elastomer foams produced by the process according to claim 1.

6. Polyurethane elastomer foams produced by the process according to claim 4.

7. An automobile elastomer part which comprises a polyurethane elastomer foam according to claim 5.

8. An automobile elastomer part according to claim 7, wherein the automobile elastomer part comprises an auxiliary spring in an automobile suspension system.

9. An automobile elastomer part according to claim 8, wherein the automobile elastomer part comprises an auxiliary spring in an automobile suspension system.

* * * * *